United States Patent [19]

Carden

[11] 4,449,425
[45] May 22, 1984

[54] MOTION TRANSMITTING DEVICES

[75] Inventor: John C. Carden, Nassau, The Bahamas

[73] Assignee: Quadrant Drive BV, Leersum, Netherlands

[21] Appl. No.: 345,114

[22] Filed: Feb. 2, 1982

[30] Foreign Application Priority Data

Feb. 9, 1981 [GB] United Kingdom ................. 8103860

[51] Int. Cl.³ .......................... F16H 1/28; F18H 55/12
[52] U.S. Cl. ......................................... 74/804; 74/805; 74/448; 74/798
[58] Field of Search .................. 74/804, 805, 448, 798

[56] References Cited

U.S. PATENT DOCUMENTS

| | | | |
|---|---|---|---|
| 2,966,808 | 1/1961 | Grudin | 74/805 |
| 3,726,158 | 4/1973 | Brown | 74/804 |
| 3,783,712 | 1/1974 | Colinet | 74/805 |
| 4,023,440 | 5/1977 | Kennington et al. | 74/804 |
| 4,194,415 | 3/1980 | Kennington et al. | 74/805 |

FOREIGN PATENT DOCUMENTS

| | | | |
|---|---|---|---|
| 1339301 | 6/1962 | France. | |
| 2038992 | 7/1980 | United Kingdom | 74/805 |
| 752076 | 7/1980 | U.S.S.R. | 74/805 |

Primary Examiner—Allan D. Herrmann
Assistant Examiner—D. Wright
Attorney, Agent, or Firm—Beveridge, DeGrandi and Kline

[57] ABSTRACT

A motion transmitting device of the quadrant drive type has a wheel, preferably toothed, a plurality of independently movable elements for successively engaging the wheel, a datum member and an eccentric effecting eccentric relative motion between the wheel and the datum member. Connector pins movable in ovoid or circular holes in the wheel and datum guide the movable elements into and out of engagement with the wheel. The movable elements are not linked, as in a chain, but means are provided to prevent them from any tilting or substantial rotation with respect to the datum member.

63 Claims, 20 Drawing Figures

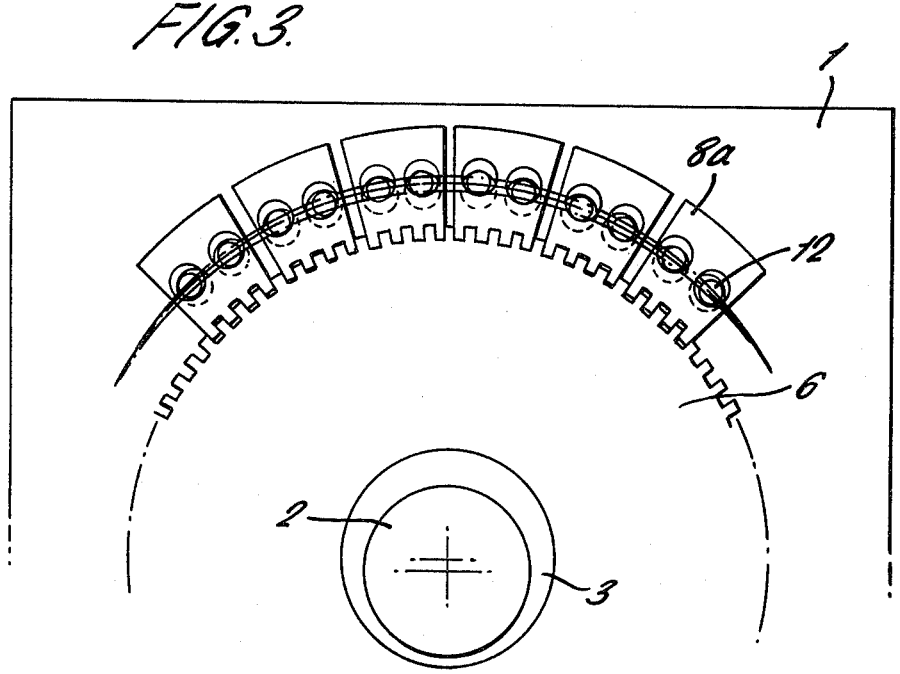
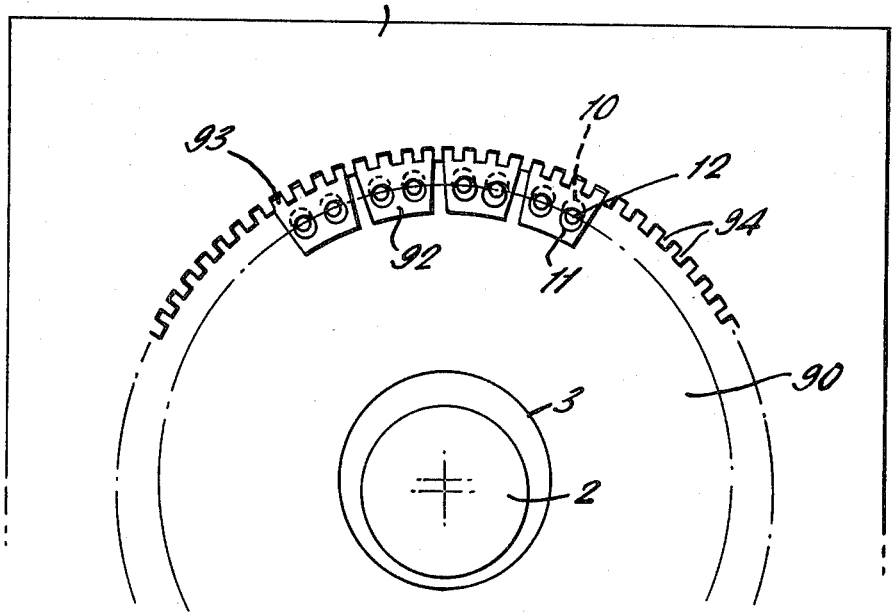

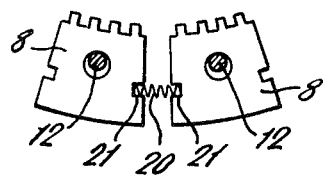
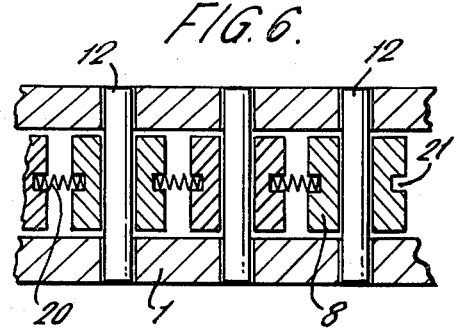
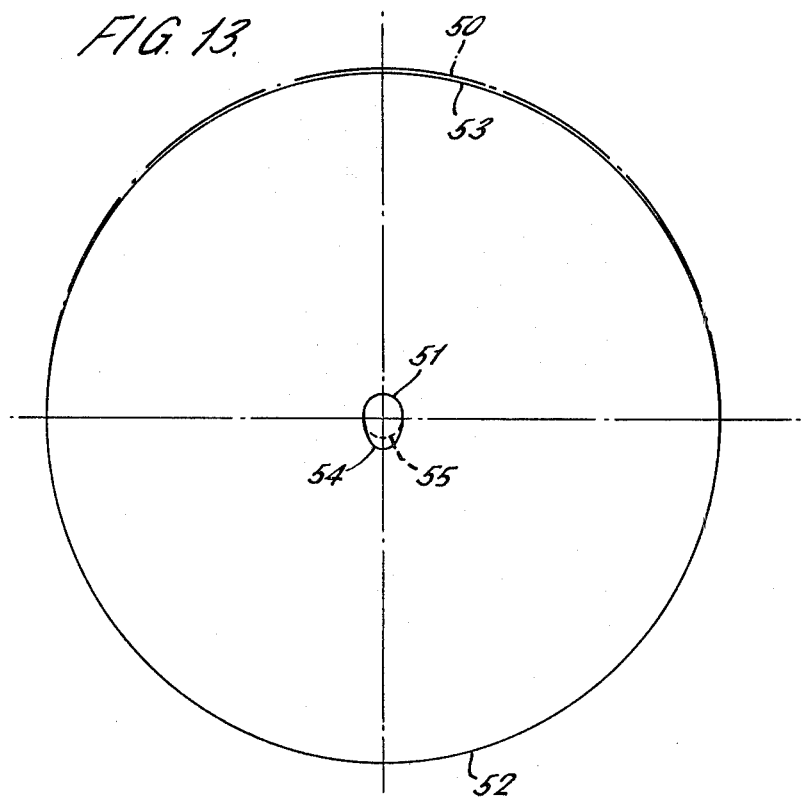

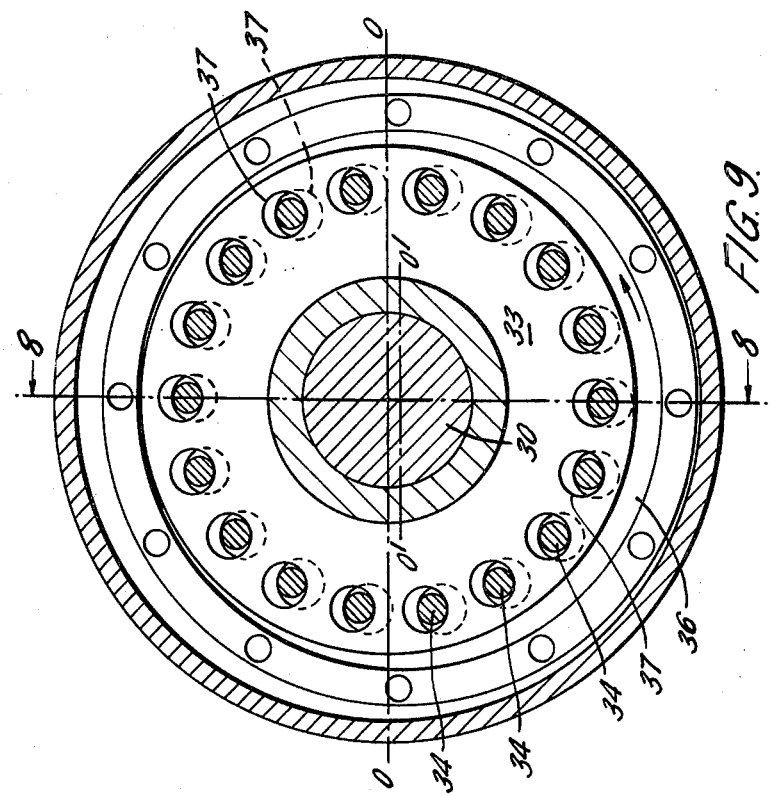
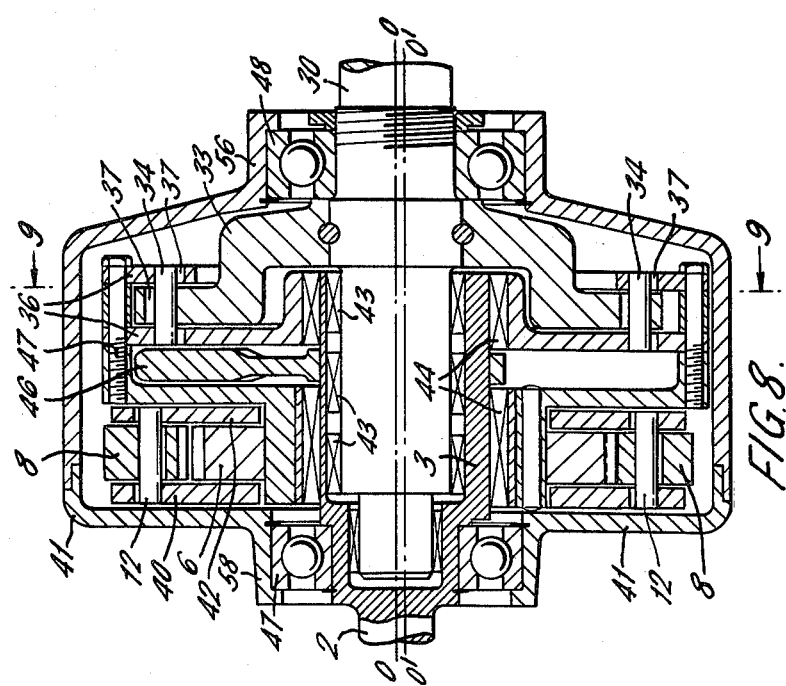

MOTION TRANSMITTING DEVICES

BACKGROUND OF THE INVENTION

1. Field of the Invention

This invention relates to motion transmitting devices of the kind known as quadrant drive devices.

2. Prior Art

Quadrant drive motion transmitting devices, which may be used for speed changing, torque conversion and the like, are described for example in U.S. Pat. Nos. 4,023,440 and 4,194,415 (U.K. Nos. 1519588 and 1585961 ) and in U.K. Application No. 8011061. In conventional gearing arrangements, engagement is provided normally only by one tooth at a time. In the quadrant drive devices, meshing elements are employed which may remain in driving engagement with wheel means through a substantial fraction of a cycle; drive may be effective over nearly a quadrant of arc on the wheel means. Such devices essentially comprise eccentric means, wheel means and independently movable meshing elements the movement of which is controlled by movement limiting means so that the meshing elements move in and out of engagement with portions of the wheel means. Reference may be made to the above-mentioned specifications for full descriptions of such devices. In U.S. Pat. No. 4,194,415, it is explained that the meshing elements may comprise links with two or more teeth, these being links of a chain. The present invention is directed to an improved form of quadrant drive motion transmitting device in which the meshing elements are independently movable and need not be linked in a chain but in which it is still possible to retain the high efficiency arising from pure rolling motion between relatively moving load-transmitting elements. As will be apparent from the following description, the present invention has particular advantages using a wheel with close-pitched teeth or a frictionally-driven wheel and hence enabling high torque or speed ratios to be obtained.

BRIEF SUMMARY OF THE INVENTION

According to one aspect of this invention, a motion transmitting device including eccentric means, wheel means, non-linked and non-rotatable independently movable elements adapted to engage said wheel means and movement-limiting means including a datum member with first profiles, second profiles in said independently movable elements and individual connector elements each engaging a first profile and a second profile to be held in captive dependency thereby wherein rotation of the eccentric means causes said movable elements sequentially to become engaged with a portion of the wheel means and subsequently to become disengaged therefrom, said independently movable elements being individually guided by said movement-limiting means within predetermined limits of orbital motion relative to said datum member such that a plurality of said independently movable elements are always simultaneously in engagement with and stationary relative to a respective portion or portions of the wheel means whilst drivingly engaged, said first and second profiles constraining the independently movable elements to move into engagement with the wheel means and to remain in engagement therewith over an arc of less than a semicircle and disengaging means constraining the independently movable elements to disengage from and to remain disengaged from the wheel means over the remaining arc.

In this construction, unlike the arrangements of the aforementioned U.S. Pat. Nos. 4,023,440 and 4,194,415, the independently movable elements are not linked in a chain. These elements are made non-rotatable, that is to say, they are prevented from any substantial rotational movement or tilting with respect to the datum member about any axis through the element parallel to the axis of the wheel means. This ensures that the elements, when out of engagement, cannot tilt and foul the wheel means, and, when engaged, are not tilted by the torque reaction of the wheel means. As will be described later, there are a number of ways in which this non-rotatability can be achieved. Very conveniently, it is obtained by providing two of said individual connector elements for each of said independently movable elements.

Said independently movable elements may be arranged around the outside of the wheel means in what will be referred to as a male configuration or they may be inside the wheel means in what will be referred to as a female configuration.

If a male arrangement is considered in which the independently movable elements lie around the wheel means and are moved inwardly into engagement with the wheel means, then the radially inward portions of said first profiles and the radially outward portions of said second profiles can be shaped to hold the meshing elements out of engagement with the wheel means over the required arc; these portions of the profiles thus form the aforementioned disengaging means. Other forms of disengaging means may be employed, for example, springs between adjacent ones of said independently movable elements.

As in known quadrant drive devices, considering the three integers, namely the eccentric means, the wheel means and the datum member, any one of these three integers may be used as the input to the motion transmitting device and any other one may be used as the output. The third integer may be a second input or a second output but, in general, is fixed. In a male configuration, it is convenient to use the eccentric as the input and the wheel means as the output with the datum member fixed, assuming a speed reduction is required. The input and output are interchanged if a speed step-up ratio is required. For a female configuration, it is convenient to use the eccentric as the input (or output) and the datum member as the output (or input), the wheel means being fixed.

In the constructions of, for example, U.S. Pat. No. 4,023,440 and U.S. Pat. No. 4,194,415, use has been made not only of the implosive octant but, also, to increase the effective arc used for power transmission, use has been made of the explosive octant, which is a region where the meshing elements tend to move outwardly from the wheel means. In the arrangement of the present invention, by using only the implosive portion of the power cycle, those cycles of the first and second profiles, which would be necessarily utilised if the explosive portion of the cycle is used, are now redundant and can now be used to ensure positive disengagement. In the arrangement of the present invention, the datum plate and connector means can constitute the only linkage between the meshing elements. There is no need for the meshing elements to be further linked, for example by being formed as links of a chain as in the arrangements of the specifications referred to above, where the further linking serves to help control the movement of the links.

The independently movable elements conveniently are meshing elements having teeth adapted to mesh with teeth on said wheel means. Alternatively however the independently movable elements and wheel means may be adapted for frictional engagement when the elements are moved into contact with the wheel means.

Each of the independently movable elements has to engage the wheel means for torque transmission but must be capable of being moved radially with respect to the wheel so that the element can be moved into and out of engagement with the wheel. When in engagement, there is no relative motion between the wheel means and the element. The elements and wheel means preferably have complementary mating surfaces to give a large rigid contact when in engagement.

The wheel means may be a toothed wheel with evenly spaced teeth. In a male configuration, these are outwardly directed teeth whereas, in a female configuration, they are inwardly directed teeth. Each independently movable element meshes with these teeth when in engagement with such a toothed wheel and is conveniently referred to as a meshing element. Such a meshing element may extend around an arcuate portion of the wheel embracing several teeth on the wheel. Preferably in such an arrangement each meshing element is shaped so as to engage with all the teeth in the arc over which the element extends but, as will be apparent from the following description, the device would be operative even if the meshing element only had one tooth engaging the wheel in that arc. Multi-tooth engagement is preferred to share the load.

The teeth on the meshing elements and wheel means are not gear teeth and do not transmit any load whilst in relative motion. The meshing elements, when in load transmitting engagement, do not move relative to the wheel means. It is thus possible to use simple and readily manufacturable shapes for these teeth.

The teeth on the meshing elements are conveniently of inverted dovetail shape, facing radially inwardly of the wheel means and with the narrower end of the dovetail radially innermost and the wheel means has recesses complementary to the teeth on the meshing elements, these recesses being evenly spaced around the periphery of the wheel. If the meshing element has a plurality of teeth, these are positioned to face inwardly for a male configuration or outwardly for a female configuration in appropriate radial directions with respect to the centre of the wheel so that when one of the meshing elements is pressed against a circumference of the wheel, it forms a perfect fit around an arc of the wheel and becomes in effect part of the wheel.

The inverted dovetails serve to provide a perfect joint between the meshing elements and the wheel means in a similar manner to wooden joints made by machine tools where the dovetail is inverted (as distinct from hand-made dovetail joints where the dovetail has its larger end outermost to cause the joint to lock). The inverted dovetails are used in the present case so that the meshing elements and wheel means may move in and out of engagement during each cycle.

Since the inverted dovetail joint provides full area contact between the adjoining flanks of adjacent dovetails, unlike meshing gear teeth, it becomes possible to make the dovetail pitches very fine yet retaining considerable strength in the joint. This is in addition to the inherent advantage of a plurality of dovetails being meshed at any one time. It is thus possible to have very high ratios handling high torques with small unit size. The meshing elements are under no load while engaging and disengaging from the wheel means and, because of the very small radius of gyration of the eccentric, 1 mm in the example described above, very high efficiencies are possible. In addition there is pure rolling motion between all the torque transmitting elements, specifically the connector elements engaging their profiles. For these reasons it becomes possible to build units which can accept very high input speeds.

As explained above, in view of the very small eccentricities that are possible with this configuration, taking the output back to an axis concentric with the input can be done with a very simple coupling; any one of a number of proprietary couplings on the market may be used.

With the arrangement of the present invention, the meshing elements are maintained in engagement with the wheel means only in the radially implosive portions of the driving and reverse driving cycle. The driving portion is within approximately an octant and the reverse driving portion, of generally similar arcuate extent, lies over an adjacent arc of approximately an octant. Thus the engagement between the meshing elements and the wheel means extends over a region of approximately a quadrant of a circle. During the remaining part of the cycle, the meshing elements are positioned by said movement-limiting means to be out of engagement with the wheel means.

In a quadrant drive apparatus having teeth on meshing elements engaging a toothed wheel, if the number of teeth on the wheel differs from the number of teeth (or teeth spaces) on the meshing elements, then the device forms a speed changing or torque conversion system as is described in the aforementioned specifications. However, by using a plurality of teeth on each meshing element and shaping the first and second profiles so that each cycle of orbital movement of the meshing element changes the position of that element with respect to the wheel by one tooth pitch on the wheel, a very high ratio may be obtained. It is convenient, in describing the present invention, to consider a specific example. If the wheel has 79 evenly spaced teeth and if there are 20 meshing elements each with 4 teeth evenly disposed along an arc on the radially inward edge of the meshing element, this arc being a portion of the circle whose radius is identical to that of the wheel, then it is possible to obtain a speed ratio of 79:1. The movement-limiting means may comprise a datum plate having 20 holes constituting first profiles, through which pass rollers, constituting the aforementioned connector elements, which rollers also each pass through a hole in a meshing element this hole constituting the aforementioned second profile. In a typical example, the pitch of the teeth on the wheel means (and on the meshing elements) might be 4 mm, measured half-way up the sides of the inverted dovetails. Then the holes in the datum member would be disposed around the circumference of a circle with the pitch of the holes being 16 mm, plus an amount represented by the radially outward disposition of these holes from the arc on the meshing elements at which the 4 mm tooth pitch is measured. This arc corresponds to the radius of the circle of the wheel means. It is desirable that the eccentric means effecting eccentric motion between the datum plate and the wheel means has a pitch of one quarter of the pitch of the teeth and thus the eccentricity would be 1 mm. In motion transmitting devices of this nature, if one considers the three integers namely the eccentric means, the wheel means and the datum member, one of these elements may be driven to provide a rotational input and another provides a rotational output. A third would provide the reference with respect to which the first and second rotate and would normally be fixed. As previously mentioned, it is convenient in a male configuration to fix the datum member. To obtain a speed reduction the input may then be to the eccentric and the output taken from the wheel means. It will be readily apparent from the figures given above that the very small eccentricity makes it readily possible to obtain a coaxial input and output using a very simple form of coupling, e.g. a flexible shaft.

This high ratio can be achieved because the orbital movement of the meshing elements, for each cycle, gives an advance of one tooth which is, in this example, only one quarter of the number of teeth on a meshing element. It will be immediately apparent that friction drive constructions, by appropriate choice of the magnitude of the orbital movement with respect to the circumference of the wheel means, can readily provide very high speed ratios.

It is preferred in a male configuration that the side flanks of the meshing element are straight and form radii to the centre of the wheel means when drivingly engaged to have firm engagement with their neighbouring elements in the implosive portion of the power cycle and the reverse power cycle, that is to say when the meshing elements are in engagement with the wheel. The elements can then support one another as in the stones of a circular arch. The radially inward forces acting on the elements in this implosive portion of the power cycle are very similar to the forces imposed by gravity on the stones of an arch. These inward forces hold the meshing elements in engagement with the wheel means. By using elements abutting one another as described above, they are prevented from tilting over relative to the wheel means when torque is applied, as occurs due to the abutment of one meshing element against an adjacent one. The meshing elements which are not located in the implosive portion of a power cycle or the reverse power cycle will not be engaged with the wheel means. They are moved outwardly to be further away from the centre of the wheel means. Thus, in the example given above, there is room to accommodate a total of 80 teeth on the meshing elements and 79 on the wheel means even although the circumference of the arc of the circle on the pitch line of the teeth of the meshing elements is identical to the circumference of the circle on which are disposed the inverted dove-tails on the wheel means. When the meshing elements are out of engagement, they move radially outwardly and will separate from one another.

The disengagement of the meshing element is controlled by the aforementioned profiles which are engaged by the connector elements. These connector elements, as will be explained later, conveniently are roller pins. The profiles are conveniently holes which are suitably shaped. As is explained in U.S. Pat. No. 4,194,415, these profiles are theoretically ovoid holes. The ovoid shape is required only however over part of the circumference of each hole. Since the radially inward portion of each hole on the datum is not being used (since only the implosive portion of a power cycle is being used) it is convenient to form this non-used portion of the hole in the shaoe of a semi-circle. The same may be done with the radially outward portion of the ovoid hole on the meshing element. With the construction described above, it is possible to retain large roller pins and for example it would be possible to use pins equivalent in size to those which would be used with a 16 mm pitch chain loop in the arrangement of U.S. Pat. No. 4,194,415 but with a high ratio device having only 4 mm pitch meshing elements on the wheel means and meshing means as described above. The cross-sectional area of a roller pin for a 16 mm pitch is very much greater than that for 4 roller pins for a 4 mm pitch chain loop. The manufacturing problems are very considerably simplified. Since the base locus line of the holes forming the first and second profiles is constructed for an eccentricity of 1 mm and for 4 mm pitch teeth, and also since the arrangement described above is a double ovoid configuration with profiles in the meshing elements and in the datum member, so that the base loci in each case are halved compared with a single ovoid configuration of U.S. Pat. No. 4,023,440, and furthermore since the roller pin is the size required for a 16 mm chain loop, the base loci content of the ovoid hole becomes very small relative to the circular content of the hole caused by the comparatively large radius of the roller pin. This means that the hole is necessarily such closer to circular form. In practical embodiments it becomes possible to utilise circular holes because the base loci content of the ovoid hole becomes negligible. This departure from the theoretical ideal shape can greatly reduce the cost of manufacture without significant loss and efficiency. The inherent elasticity of the device accommodates the small inaccuracies created by the departure from the theoretically ideal shape.

A further advantage of this configuration is that, although the pitching of the roller pins or other connector elements is large compared with the pitch of the teeth on the wheel and meshing elements, because of the small eccentricity the radius of gyration is small. Thus the difference in the circumference of the roller pin and the holes is small which results in very low rolling speeds of the roller pins in their holes.

As previously mentioned, a part of the profile may not be used and this leads to the possibility, as will be explained later, of employing, on either the movable elements or the datum member, of "open-loop" profiles, that is to say part ovoid or part circular profiles, thereby making possible further economy of manufacture.

In the foregoing, reference has been made to first and second profiles. Each profile may be larger than the connector element (usually a pin) which engages it, thereby giving a "double-ovoid" form of operation analagous in some respects to the double-ovoid construction of the aforementioned U.S. Pat. No. 4,194,415. However a "single-ovoid" arrangement analagous to U.S. Pat. No. 4,023,440 may be employed, the connector elements rolling around either the first profiles but being journalled in the movable elements or rolling around the second profiles and being journalled in the datum member.

Whilst, as has already been explained, by modifying that portion of the profiles in the datum member and in the meshing elements which would normally be used for the explosive portion of the power cycle so that these portions of the profiles are semi-circular, it is possible to ensure disengagement of the meshing elements during the cycle apart from the parts constituting the power cycle and reverse power cycle.

When the meshing or other independently movable elements are disengaged from the wheel means, they can no longer act like keystones because their flanks no longer abut one another. In this condition there is a possibility of the disengaged meshing elements tilting. Second movement limiting means are therefore preferably provided to prevent such tilting. In one convenient form, each element has a tongue extending into a groove in the next adjacent element so as to limit tilting as the elements move apart. Other movement limiting means may be used. For example, light compression springs may be located between the flanks of the meshing elements to ensure that they do not tilt and that all remain radially outwardly disposed away from the axis of the wheel means. Such springs also serve to ensure that the elements move apart in the disengaged portion of the cycle.

One of the most convenient ways of preventing tilting however is to make use of two connector pins for each of said independently movable elements. This specific configuration eliminates any necessity for abutment to control the meshing elements in the engaged portion of the cycle.

The invention includes within its scope a quadrant drive motion transmitting device having eccentric means, wheel means with portions shaped to engage with independently movable meshing elements and movement limiting means including a datum member, the eccentric means being arranged to cause the meshing elements sequentially to enter into and subsequently move out of engagement with portions of said wheel means, said meshing elements being individually guided by said movement limiting means through independent connector elements and wherein, of the three integers comprising the eccentric means, the wheel means, the datum member, one is connected to a rotational input, another is connected to a rotational output and a third is fixed characterised in that the wheel means comprises a wheel with (mn − 1) evenly spaced stations for engaging meshing elements and in that there are m meshing elements, each having an inwardly facing portion adapted to engage with the wheel over an arcuate extent of n stations on the wheel, where m is an integer equal to or greater than 8 (and preferably equal to or greater than 16), n is an integer equal to or greater than 2 (and preferably equal to or greater than 4) and furthermore characterised in that the meshing elements have side flanks shaped such that these elements, when in engagement with the wheel, form a rigid arch. The stations are conveniently outwardly directed teeth as previously described.

The movement-limiting means preferably includes, for each meshing element, a connector pin adapted to roll around a closed profile on the datum member and a closed profile on the meshing element.

As previously explained, the profiles may be shaped so that each meshing element is held out of engagement from the wheel means over an arc greater than 180° by suitably shaping the radially inward portions of the profiles on the datum member and the radially outward portions of the profiles on the meshing elements.

Preferably each meshing element has n teeth or is shaped to engage with n teeth on the wheel. It is desirable but not necessary for all stations on the wheel in the power octant and reverse power octant to be filled. However the device will operate even if some stations are not occupied.

BRIEF DESCRIPTION OF THE DRAWINGS

FIGS. 2, 3 and 4 are each a front elevation, similar to part of FIG. 1 but showing respectively three modified constructions of meshing elements;

FIG. 5 is a front elevation illustrating two meshing elements of another construction;

FIG. 6 is a side view partly in section, of part of the device of FIG. 5;

FIG. 8 is a cross-section, along the line 8—8 of FIG. 9, of a two-stage device according to the invention, in which the second stage is a planocentric device;

FIG. 9 is a cross-section along the line 9—9 of FIG. 8;

FIG. 13 illustrates a profile such as might be used in an embodiment of the present invention;

FIG. 17 is a further front elevation illustrating a modification of the construction of FIG. 1;

DESCRIPTION OF PREFERRED EMBODIMENTS

Figure 1:
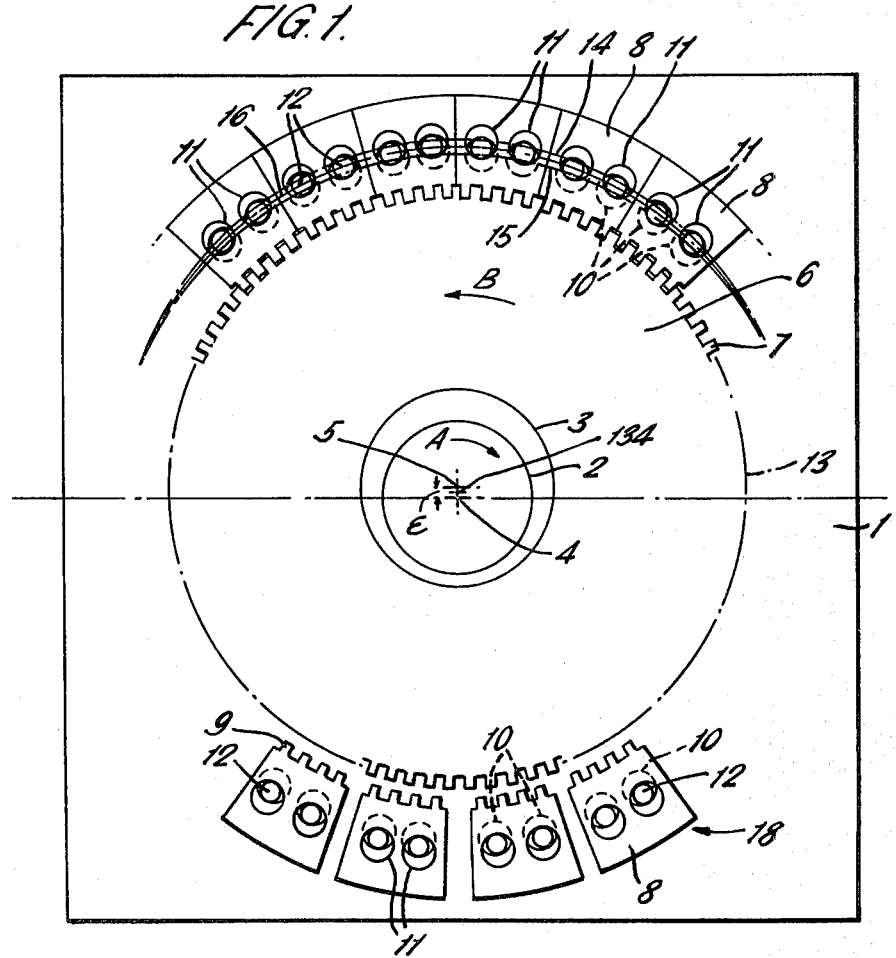
FIG. 1 is a front elevation showing diagrammatically a datum plate, wheel means, some of the meshing elements and the associated connector elements of a motion transmitting device forming one embodiment of the invention.

Referring to FIG. 1 there is shown diagrammatically a motion transmitting device having a datum member 1 with an input shaft 2 and eccentric 3. The centres of the input shaft and of the eccentric are indicated at 4 and 5 respectively. The eccentricity is the distance $\epsilon$. A wheel 6 is free to rotate about the eccentric, that is to say on the centre 5. This wheel, in this particular embodiment has 79 teeth 7. The spaces between the teeth are of inverted dovetail form, that is to say they have straight sloping sides which diverge in a radially outward direction symmetrically about the radius through the centre of the space. The device has 20 keystone-shaped meshing elements 8 of which only some are shown in the drawings. The shape of these meshing elements is such that their flanking surfaces abut one another when the meshing elements are in contact with the wheel means forming a circular arc about the centre of the wheel. Each meshing element has four radially inwardly extending teeth 9, the shape of these teeth being complementary to the gaps between the teeth on the wheel means. Thus, when the meshing elements 8 are in engagement with the wheel, as in the upper part of FIG. 1, they abut one another to form a rigid arch and engage with the wheel so that the elements and wheel together constitute a rigid assembly.

The datum plate 1 has 40 holes 10 constituting the aforementioned first profiles, these holes being evenly spaced on a circle around the centre of rotation of the input shaft. Each meshing element has two holes 11, each constituting one of the aforementioned second profiles. For each hole in each meshing element there is a roller pin 12 which passes through the hole 11 in the meshing element and the corresponding hole 10 in the datum plate. These roller pins constitute the aforementioned connector elements.

The inverted dovetail-shaped spaces between the teeth on the wheel 6 lie on a pitch circle 13 which is centred on the centre 5 of rotation of the wheel. The holes 10 in the datum plate have design centres on a pitch circle 15 which is centred on the centre of rotation 4 of the input shaft 2. The pins 12 are roller pins which roll around the peripheries of the profiles of the holes 10 and 11 and serve to control the position of the meshing elements. As is readily seen in the lower part of FIG. 1, the meshing elements are constrained over part of the arc to lie out of engagement with the wheel. In the particular position shown at the bottom of FIG. 1, the pins 12, under gravity, rest on the lower periphery of the holes 10 in the datum member 1 and the elements 8, under gravity, rest on the pins 12. In general however, the shaping of the holes 10 and 11 positively hold the elements 8 in or out of engagement with the wheel 6 as necessary. The design centres of the holes 11 in the meshing elements, when they are drivingly engaged with the wheel, as in the top half of FIG. 1, lie on an arc 14 of a pitch circle whose centre is 5. The longitudinal axes of the roller pins 12, when drivingly engaged, lie on an arc 16 of a circle whose centre 134 is disposed at a point equidistant between the points 4 and 5. For clarity the difference in positions of these arcs has been exaggerated in FIG. 1.

The meshing elements 8 in the upper part of FIG. 1 are in the implosive portion of the power cycle and the reverse power cycle. This portion comprises approximately an octant (on the upper left side of the figure for the directions of rotation shown by the arrows A and B) forming the driving cycle and another adjacent octant (towards the upper right of the figure) constituting the reverse driving cycle. The elements shown at 18 in the lower part of the figure are in the disengaged portion of the cycle.

In the construction of FIG. 1, assuming the datum plate 1 is held fixed, rotation of the input shaft 2 drives the eccentric 3 and hence causes the wheel 6 to gyrate. The teeth 7 on the wheel 6 engage with the teeth 9 on the meshing elements 8. This construction with 79 teeth on the wheel 6 and 80 on the elements 8 forms a speed reducing motion transmitting device giving a ratio of 79:1 if the output is taken from the wheel. The meshing elements 8 are constrained, by the connector pins 12 engaging the first profiles in the datum plate and the second profiles in the meshing elements, to move cyclically into and out of engagement with the wheel so that over a substantial arc of the wheel, the elements 8 remain in engagement with the wheel. The multiple tooth engagement of several meshing elements enables high torques to be transmitted by the device.

As will be described in further detail later, the profiles are shaped so that the meshing elements are positively moved out of engagement from the wheel over the disengaged portion of the cycle, the lower half in the condition shown in FIG. 1. Because they are positively disengaged in this way, there is no need to link the elements 8 into a continuous loop, as in the arrangements of the aforementioned U.S. Pat. Nos. 4,023,440 and 4,194,415 (U.K. Nos. 1519588 and 1585961) and European Published Application No. 0037387 (U.K. Application No. 8011061), where endless chain constructions are employed. This considerably simplifies the construction and assembly of the device. The elements 8, being non-linked, are independently movable. However, because of their possible independent movement, in order to prevent them tilting and fouling the wheel when in the disengagement part of the cycle, the meshing elements are made non-rotatable, that is to say means are provided for preventing any element 8 from substantial rotational movement about an axis through the element parallel to the axis of the wheel. In the particular construction shown in FIG. 1, substantial rotation of elements 8 is prevented by the use of two pins 12 engaging separate holes 11 in each meshing element. These pins 12 in conjunction with the profiles in the datum plate thus serve not only to guide and hold the meshing elements in engagement with the wheel during part of the cycle and to disengage the meshing elements and hold them disengaged during another part of the cycle but also to prevent any substantial rotation of the meshing elements.

The two pins 12 for each element 8 need not necessarily be located on a common circle about the centre of the wheel in order to prevent the element 8 from tilting. In principle, the two pins may be located at any two points spaced apart on the element.

Figure 2:
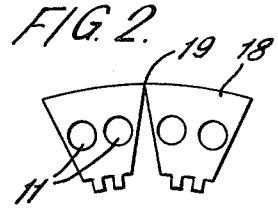

In the construction of FIG. 1, the meshing elements 8 furthermore cannot tilt when in the engaged position because they abut one another over their flanking faces. By abutting in this way, the elements 8 form a rigid arch with the whole group of elements over this arc acting as one unit transmitting torque between the datum member and the wheel. Provided that the elements 8 cannot tilt, as is ensured by the provision for example of two pins 12 for each element, it is not essential that, in abutting one another, the elements 8 should have area contact. For example, the elements might be shaped as shown at 18 in FIG. 2, having contact at 19 when they are in engagement with the wheel 6.

More generally however, provided the elements cannot tilt, it is not essential that they should abut. FIG. 3 is a view, similar to part of FIG. 1, showing non-abutting elements 8a which are generally similar in other respects to those of FIG. 1, being prevented from tilting by the provision of two pins.

Figure 4:
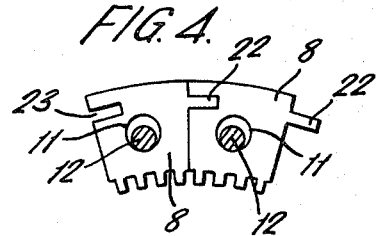

Another way of preventing tilting of the elements 8 is illustrated in FIG. 4. In this embodiment, each element 8 has only one hole 11 and pin 12 and each element 8 has a tongue 22 on one side flank of the element extending into a corresponding groove 23 on the next adjacent element. The tongues and grooves have sufficient length that the tongues do not completely disengage from the grooves even in the fully relaxed portions of the quadrant drive cycle, that is to say corresponding to the lower part of FIG. 1. The tongues and grooves serve to prevent any tilting of the meshing elements in the disengaged part of the cycle.

FIGS. 5 and 6 illustrate the provision of compression springs 20 between the elements 8, these being located in holes 21 in the lateral flanks of the elements and serving to keep these elements apart in the disengaged portion of the cycle. These springs 20 moreover assist in preventing any tilting of the meshing elements. The springs 20 also cause disengagement of these elements from the wheel.

FIG. 6 is a side view of the device taken along a section plane extending arcuately through the connector pins 12. As seen in FIG. 5, the datum member 1 lies on both sides of the wheel 6. The pins 12 extend into both parts of the datum member and pass through the elements 8. The springs 20 are seen in FIG. 4 extending between the locating holes 21 in adjacent elements 8.

In each of the devices thus far described, the individual elements 8 or 8a are multi-tooth elements extending, when in the engaged position, around an arc of the wheel 6 embracing several teeth. The movement-limiting means constituted by pins 12 and holes 10, 11 cause the elements to effect orbital movements giving a relative movement between the element and wheel of one tooth per cycle. This can be achieved even if the elements 8 are not multi-tooth elements.

Figure 7:
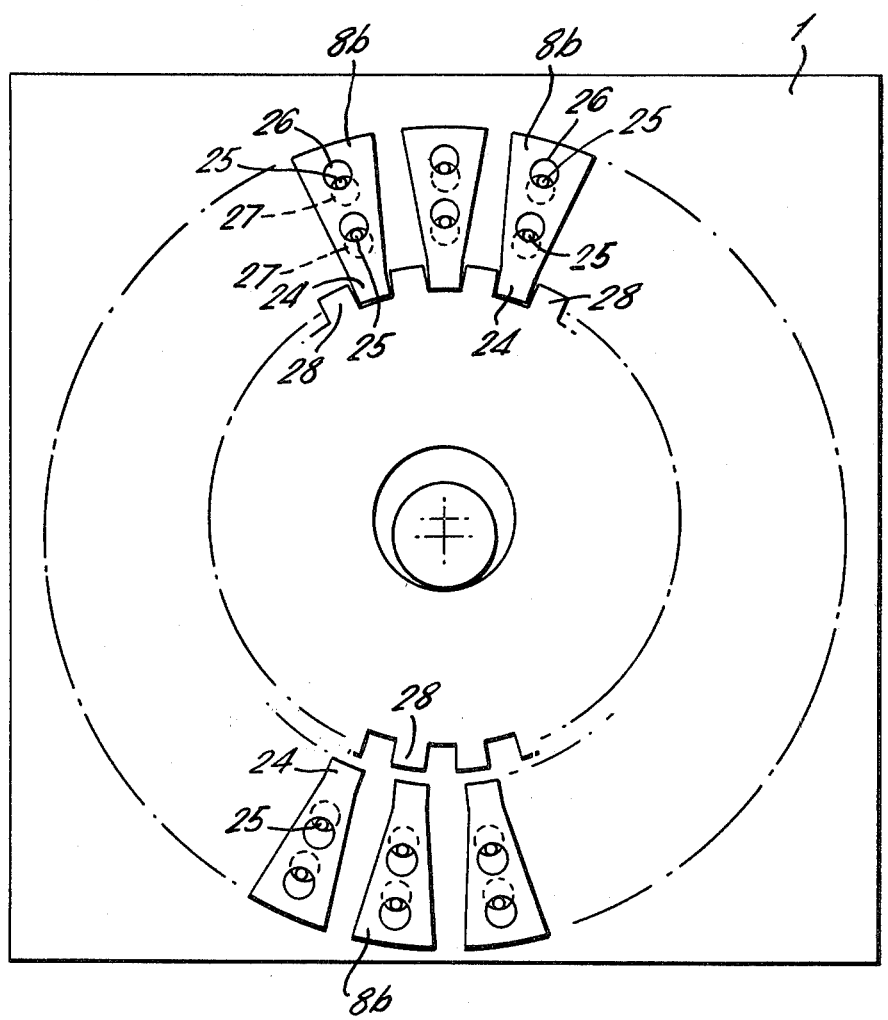
FIG. 7 is a front elevation, similar to part of FIG. 1 but showing a modified construction.

FIG. 7 illustrates the extreme condition where the elements 8b each have only one tooth 24. In this figure, the elements 8b are shown spaced apart in the engaged part of the cycle and each is prevented from tilting or rotation relative to the datum plate 1 by two pins 25 which engage in ovoid or circular holes 26 in the element 8b and in ovoid or circular holes 27 in the datum plate 1. In this embodiment, the holes in each element are spaced radially, instead of circumferentially as in FIG. 1. This construction is particularly advantageous with motion transmitting devices with lower torque ratios than that of FIG. 1, for example with twenty elements engaging nineteen teeth 28 on the wheel. It will be noted that such a device, unlike the quadrant drive devices of U.S. Pat. Nos. 4,023,440 and 4,194,415 (U.K. Nos. 1519588 and 1585961) avoids any necessity for the elements to be linked in a chain. The gear profile can be made very simple and hence the wheel can, for example, be of sintered metal construction as also can be the meshing elements. The standard of finish of the components can be considerably relaxed compared with the aforementioned prior quadrant drive constructions as there is no relative motion of the elements 8b with respect to the wheel during the power transmitting part of the cycle.

It is generally convenient to employ a balanced construction with the wheel means located between two datum members or with a datum member located between two wheel means.

In the construction of FIG. 1 and its modifications described above, reference has been made to the input shaft 2; the output can be from the wheel 6. More generally, in such constructions having a shaft 2, a wheel 6 and a datum plate 1, any one of these three components may be used as the input, any other one as the output and the third may be fixed. The speed and torque ratios will depend on the choice of the input and output.

Referring to FIG. 1, if the output is taken from a rotating and gyrating element such as the wheel 6, it will often be desirable to provide means for bringing the rotary output back to an axis co-linear with or concentric with the axis of the input shaft. Known forms of "back-to-centre" couplings may be used for this purpose. With high ratio motion transmitting devices of the present invention, the eccentricity can be very small and it may often be possible to use a very simple "back-to-centre" coupling such as a flexible shaft. However a preferred form of coupling, having a high efficiency, will be described with reference to FIGS. 8 and 9.

In FIGS. 8 and 9 is shown a motion transmitting device in which the torque converter is essentially similar to that illustrated in FIG. 1, as previously described in considerable detail, together with a double planocentric device which brings back to centre the eccentrically rotating output of the first stage.

The first stage includes the input shaft 2 which is formed with an eccentric portion 3 about which bearingly rotates a toothed wheel 6. Datum plates 40 and 42 are fixedly supported on the frame 41 of the device. The wheel 6 and the datum plates 40 and 42 are similar to those previously described in connection with FIG. 1, and they interengage through the meshing elements 8 and pins 12 as also previously described.

The wheel 6 is further fixedly attached to cylindrical member 47 to which, in turn, are fixedly attached two first planocentric discs 36, which are therefore also eccentrically rotating. Between them lies a second planocentric disc 33 which is fixedly secured to output shaft 30, which is coaxial with input shaft 2. Thus, both input and output shafts (and second planocentric disc 33) are rotating about the common axis 0—0, while the wheel 6 and the first planocentric discs 36 eccentrically rotate about their axis 0'—0', their eccentricity being the distance 0—0'=$\epsilon$.

The first planocentric discs 36 and the second planocentric disc 33 have all the same number of holes 37, which have a circular profile. The holes 37 of first planocentric discs 36 and of the second planocentric disc 33 are coupled to one another by means of roller pins 34 which are thus captive within their respective sets of holes.

The centres of all holes 37 on first planocentric discs 36 are equidistantly arranged about axis 0'—0', while the centres of all holes 37 on second planocentric disc 33 are equidistantly arranged about axis 0—0, the distance between these two axes being the eccentricity $\epsilon$.

The diameter of these holes 37 is given by the formula:

Diameter of hole 37 = diameter of pin 34 + $\epsilon$.

A counterweight 46 conveniently counterbalances the forces caused by the eccentrically rotating masses. This counterweight would be positioned at other locations along the eccentric 3, the most obvious being between the frame and the wheel 6, however the location shown in FIG. 8 is a better choice because it is located between the gyrating masses, which makes possible almost perfect dynamic balancing.

It must be pointed out that this double planocentric arrangement provides not simply a constant velocity, back-to-centre, coupling means, but a very superior one, in fact, vastly superior to a conventional planocentric arrangement (having a single plate with holes) in that since this novel arrangement makes possible a pure rolling motion of the captive rollers 34 within the holes 37, it reduces friction to a (theoretical) value of zero.

Although in FIGS. 8 and 9 one form of construction for bringing the motion back to the same centre as the input has been described, other forms of coupling for this purpose will be readily apparent.

As is explained in the aforementioned U.S. Pat. No. 4,194,415, the holes 10 and 11 of FIG. 1 in the datum plate 40,42 and meshing elements 8 respectively have theoretically to be of ovoid form in order to get pure rolling motion of the roller pins 12 around these holes during the operation of the device and also to obtain multitooth engagement. The shape of the ovoids depends on the eccentricity but this shape has to be imposed on a larger shape required by the pin diameter. It will be shown later that, in certain embodiments of this invention, it is practical to depart from this theoretical shape and have circular holes.

Figure 10:
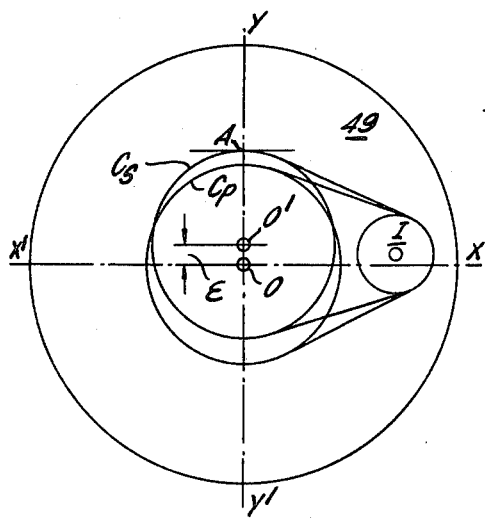
FIG. 10 is a diagram illustrating a simple mechanical construction for the experimental determination of an ovoid profile.

The actual shape of the ovoid hole may be determined experimentally using a draughting machine or theoretically. Both methods of determination have been described in published European Patent Application No. 037287. For the present purposes, reference will be made to an experimental technique. FIG. 10 is a "draughting machine" on which the shapes of such "profiles" will be determined and their parameters explored. In this machine disc 49 is the "reaction element" on which the desired profiles will be traced. These profiles will have "design centres" on pitch circle $C_p$ (having its centre at 0). $C_s$ is the pitch circle of the "action element" (having its centre at 0'). Pitch circle $C_s$ is smaller than pitch circle $C_p$ and the two circles are displaced from one another by the eccentricity $\epsilon$.

Figure 11:
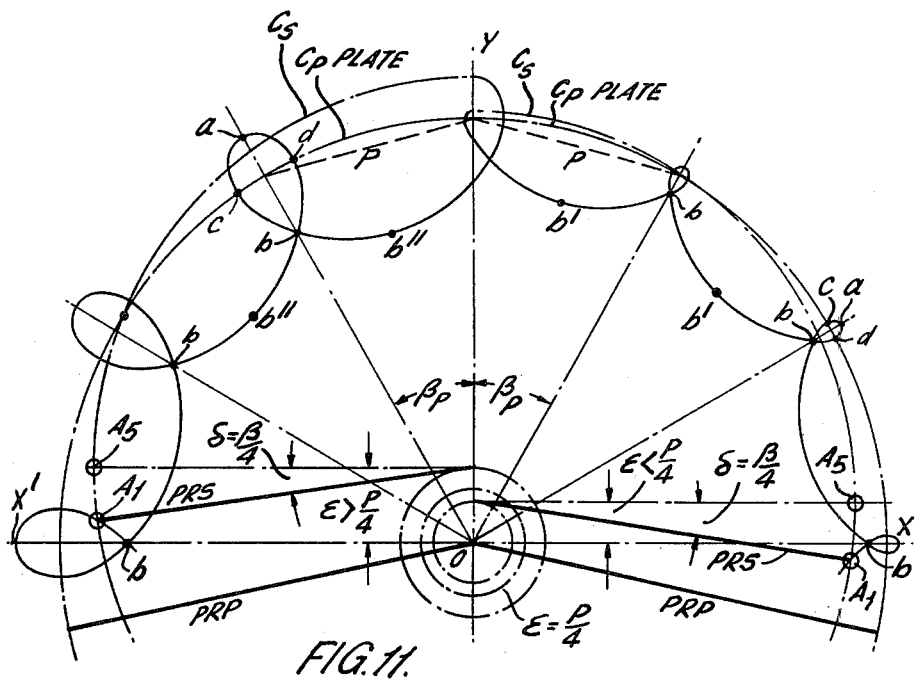
FIG. 11 shows typical traces drawn by the construction of FIG. 10.

The centres 0 and 0' are "fixed to earth", i.e. they are axes (fixed and stationary) about which $C_p$ (and disc 49) and $C_s$ may freely rotate, separately and independently from one another. Assume $C_p$ and $C_s$ to be discs, or pulleys, freely rotatable about 0 and 0' respectively. A belt is placed around $C_p$ and another belt around $C_s$ both belts encircling a common idler disc I, the spindle of which is also "fixed to earth", and a stylus is attached at point A on the periphery of $C_s$ (point A being at the greatest overlap between $C_p$ and $C_s$ above axis X'—X). Now, if $C_s$ is rotated, the stylus on it will trace on disc 49 curves of which an example is shown in FIG. 11. Note that these curves include a number of ovoid shapes, such number depending solely on the ratio of the two radii of $C_p$ and $C_s$ while the size of the ovoid (the ovoid area shown cross-hatched) depends on the eccentricity $\epsilon$. The angle $\beta p$ (see FIG. 11) depends on the ratio of the two radii of circles $C_p$ and $C_s$.

However, the eccentricity in the left of FIG. 11 is $\epsilon > P/4$, while that in the right of FIG. 11 is $\epsilon < P/4$, where P is the pitch of the ovoid holes on the datum plate.

From the "draughting machine" of FIG. 10 deduce:

1. The shape of the "profile" we are seeking is an ovoid locus.

2. The stylus (connecting meshing element, or pin, having a diameter equal to zero) on $C_s$ will engage such an ovoid on $C_p$ during a selected (design choice) fraction of a full rotation (360°).

3. If such a stylus on $C_s$ is "withdrawn" during the remaining portion of the above-noted selected fraction of a full rotation (i.e. during the angle equivalent to the b—b trace), this withdrawal could in practice correspond to a disengagement cycle, during which the stylus, i.e. the meshing connecting element, could "jump over" (i.e. advance by) one, or more, teeth, thereby obtaining considerable speed reduction. When the ovoid portion is used in the device of the invention, disengagement must occur before 90°, i.e. above the X'—X axis, or may occur after 90°, i.e. below the X'—X axis. The corresponding conditions to the above occur in FIG. 11 right and left, respectively.

Figure 12:
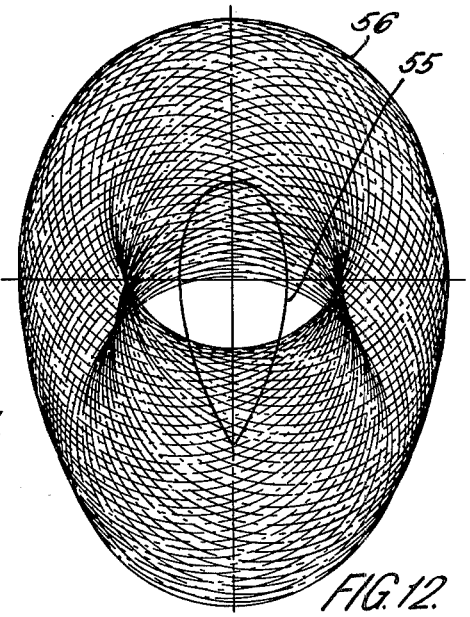
FIG. 12 illustrates a graphical determination of an ovoid profile for accommodating a cylindrical pin of a predetermined diameter.

Once the actual diameter of the pins 12 of FIG. 1 is determined, a series of circles having radii equal to that of the pins 12 are traced as shown in FIG. 12 with centres right on the ovoid 55 thus arriving at the ovoid profile 56 around the outside of these circles. This is the actual "working profile" when the pins have a given diameter.

If we form ovoid holes or profiles on the reaction element (datum plate) and ovoid profiles on the action element (meshing elements) and if we wish to have a pure rolling motion of the pins 12, we must exactly halve the size of the ovoid profile shown in FIG. 11, and we must also orient the two profiles (on the datum plate and the meshing elements) in opposite directions, more precisely, their basal ends must point outwardly, i.e. away from one another.

As previously mentioned, a pure rolling motion of the pins 12, means a (theoretical) elimination of friction, a factor that greatly improves the overall efficiency of the mechanism.

With the arrangement of the present invention using multitooth segments, the eccentricity may be made much less than P/4 and hence the base locus of the ovoid is small, as shown at the righthand side of FIG. 11. For these reasons, as the eccentricity gets smaller for a given pitch, the base locus ovoidal content of the ovoid hole becomes smaller in relation to the circular content created by the roller pin which has to be superimposed upon the base locus, but has not been correspondingly reduced in diameter since, in the example given, one pin works for four tooth pitches.

In the specific example given above with 4 mm pitch of the teeth on the wheel and with 4 teeth on each meshing element, the pin diameter is quite large, being suitable for a 16 mm pitch chain loop but the eccentricity is only 1 mm. In a double ovoid configuration, that is to say a configuration having holes in meshing elements and the datum plate each of suitable profile, the base loci for the ovoid holes is halved compared with a single ovoid arrangement. Because of these factors the base loci content of the ovoid hole in the construction of the present invention becomes very small relative to the circular content of the hole caused by the comparatively large radius of the roller pin. The exact shape of the hole, from design considerations, is an ovoid departing only very, very slightly from a true circular hole. The difference is a small fraction of a millimetre. This is illustrated in FIG. 13 where chain line curve 50 shows, in the upper half of the figure, an ovoid profile determined as described above from a base locus 51 representing the radially implosive portion of the power cycle which is to be used. Curve 54 represents the radially explosive portion which is not used and is substituted by semicircular profile 55. The working profile 50 is completed around the bottom part by a semicircular arc 52 since the shape of this part of the profile is not being used in the power cycle, but for disengagement purposes as previously described. For comparison a semicircle 53 is shown as a full line around the upper part of the figure. This shows how small is the deviation from a circle and thus why a circular hole can be used. It becomes possible, in a practical case such as has been described above, to make use of circular holes, thereby facilitating the manufacture, without significant loss in efficiency. The elasticity of the device accommodates small inaccuracies created by the departure from the theoretical shape. As previously explained, in view of the small eccentricity, the orbital locus of the roller pins, which, in the case of the previous example becomes circular, is small despite their relatively large size and hence this results in a very low rolling speed for the pins and holes. A further advantage arising from the small difference in the circumference of the roller pins compared with that of the holes in the datum plates and the holes in the meshing elements is that this greatly reduces the Hertzian stress load (that is to say stress loads due to repetitive reversal of load pressure on the surface) on the surfaces of the walls of the holes and on the surfaces of the roller pins. This in turn reduces the chances of brinelling on these surfaces.

Figure 14:
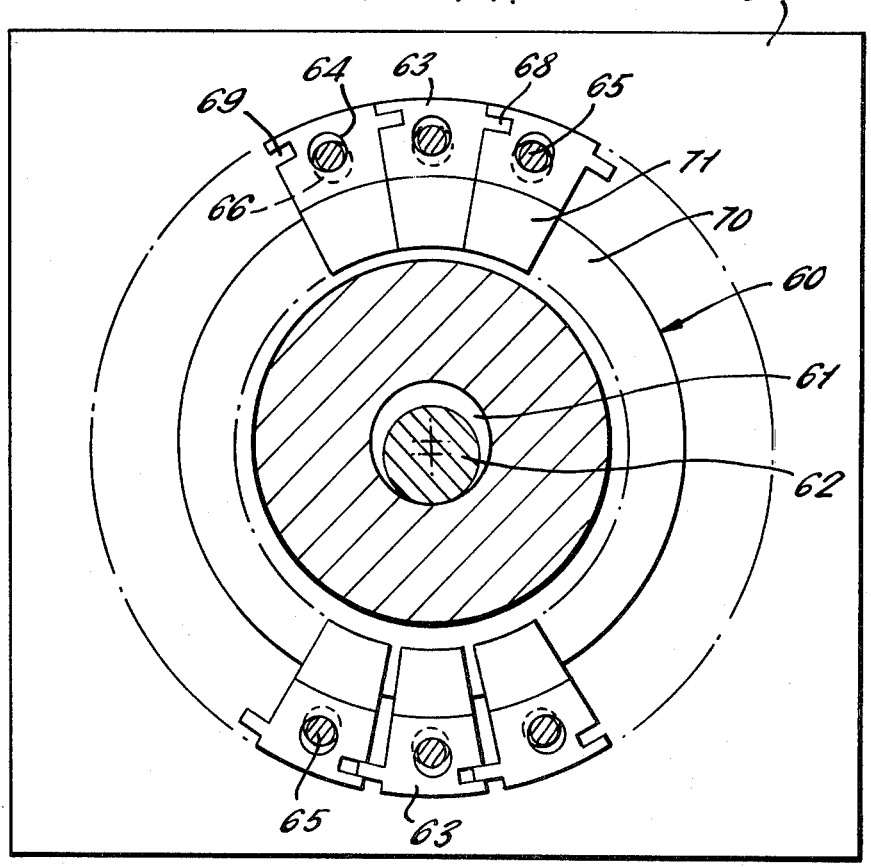
FIGS. 14 and 15 illustrate another embodiment of the invention.
Figure 15:
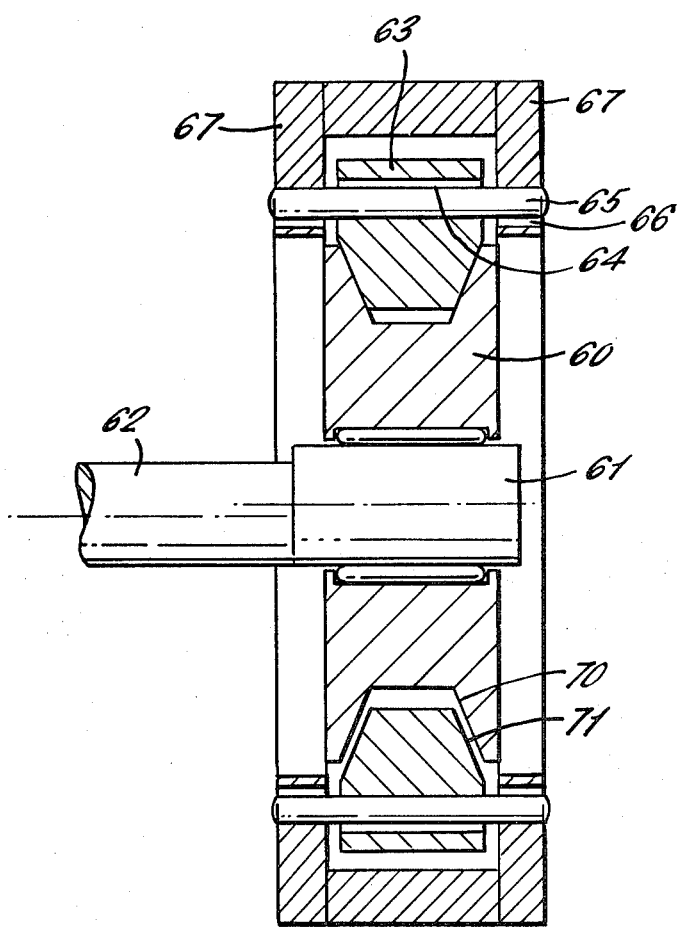

In the embodiments thus far described, toothed meshing elements have been employed. Alternatively frictionally engaging meshing elements may be employed permitting of very high speed ratios. FIGS. 14 and 15 are diagrams explaining such a device using a V-pulley and V-shaped frictional elements. FIG. 14 is a sectional elevation and FIG. 15 is a transverse section of a V-pulley 60 freely rotatable on a needle bearing (shown only in FIG. 15 for clarity) on an eccentric 61 carried on an input shaft 62. A plurality of wedge-shaped segments 63 are arranged around the pulley. Each segment has an ovoid or circular hole 64 through which passes a pin 65 of cylindrical section, the pin being in rolling engagement with the profile of the ovoid or circular hole 64 and also with the profiles of ovoid or circular holes 66 in a pair of datum plates 67, one on each side of the pulley. These datum plates are rigidly secured together to form the capturing plate assembly of a double ovoid quadrant drive in which the segments 63 move cyclically into and out of engagement with the pulley 60.

The segments in FIGS. 14 and 15 each have a single hole 64 and pin 65 and each has a tongue 68 engaging a groove 69 to prevent relative tilting, as has been described with reference to FIG. 4. Furthermore the segments abut one another when they are in engagement with the pulley. Other arrangements may be employed to prevent tilting, for example by using two pins per segment as in the construction of FIG. 1.

Because a friction drive is employed, there is now no requirement to have a cyclic displacement of one tooth pitch and it becomes possible to obtain very high reduction ratios. It will be noted that, in the present arrangement, a large area of contact can be obtained between the flanks of the segments 63 and the conical surfaces 70 of the pulley. These axially facing flank surfaces of the segments (for example surface 71 in FIG. 14) are therefore made concave to conform to conical shape of the pulley.

It will be noted that in this construction the roller pins 65 provide positive outward pull for positive disengagement of the segments in the appropriate part of the cycle. The choice of the number of segments, the size of the roller pins and the radius of the pulley can be made as a function of the torque to be transmitted and may be independent of the ratio required. With very high ratios, the eccentricity becomes small and the back-to-centre coupling can be of simple construction. Because of the small eccentricity, circular profiles can usefully be employed in this application for the reasons already given.

Provision may be made for a small adjustment of eccentricity to obtain the correct amount of friction.

In all the constructions described, a "double ovoid" arrangement has been employed having ovoids in the meshing elements or segments and in the datum means. Because of the small eccentricity which is used with high ratio devices of the present invention, it may, in many cases, be preferred to use single ovoid or circular profile arrangements. In other words the pins such as pins 12 of FIG. 1 or the pins 65 of FIGS. 14 and 15, might be journalled in either the datum means or the meshing elements and roll around the periphery of an ovoid or circular hole in the other of these elements.

In the arrangements described, the meshing elements comprise a plurality of segments. It is not essential that all the segments in any one embodiment should be identical. For example any one of the meshing elements 8 of FIG. 1 might be replaced by two or more adjacent elements, each with its pin and ovoid or circular hole or holes.

Figure 16:
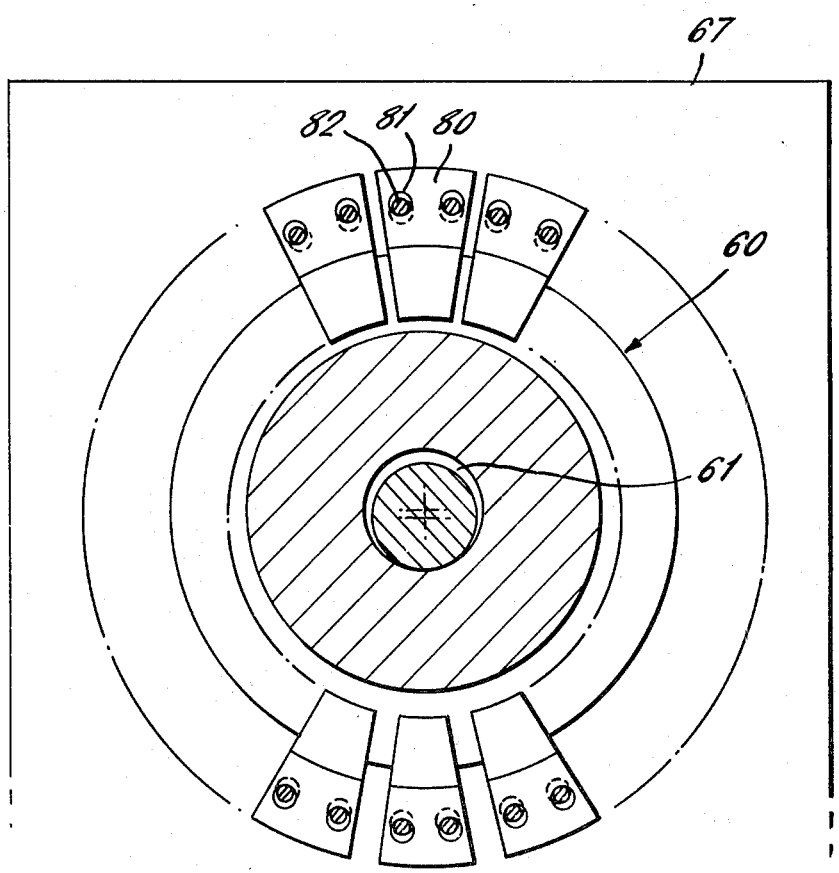
FIG. 16 is a front elevation illustrating a modification of the construction of FIG. 14.

Friction elements such as have been described with reference to FIGS. 14 and 15 need not necessarily abut one another although abutting elements, forming a rigid arch around the sector where they engage the wheel are generally preferred. FIG. 16 illustrates a modification of the construction of FIG. 14 but employing non-abutting elements 80 which frictionally engage the wheel 60. In FIG. 16, each element has two apertures 81 receiving separate pins 82 to prevent the elements 80 from tilting. Other means, such as those previously described, may be employed to prevent tilting of the elements 80 with respect to the datum plate 67.

The use of elements which are spaced apart in the part of the cycle where they engage the wheel can be used not only as in FIGS. 3 and 16, which are male configurations with the wheel inside the elements, but also in female configurations where the member with which the elements engage lies around those elements. In motion transmitting devices such as have been described, it is necessary to have an input, an output and a datum. The datum is usually fixed although there are circumstances in which it can be a second input or a second output. In the male constructions described above, more particular reference has been made to arrangements in which the input drives the eccentric, an output is taken from the wheel and there is a datum member which constrains the pins engaging the movable element. This datum member is therefore sometimes referred to as a capturing plate. For consistency in language, the capturing plate or corresponding element will still be referred to as the datum member. In the female configurations to be described with reference to FIGS. 17 and 18, this capturing plate or datum member is used as the output. The movable elements corresponding to the elements 8 of FIG. 1 are moved into and out of engagement with a surrounding female member which is referred to as the stator and which corresponds with the wheel means of FIG. 1 in that it engages the elements but would usually be fixed.

In FIG. 17, an input shaft 2 drives an eccentric 3 rotatably carrying a capturing plate 90 in which there are a plurality of ovoid or circular apertures 10 in which are pins 12. These pins engage circular or ovoid holes 11 in movable elements 92. There are two pins per element to prevent any substantial rotational movement or tilting of these elements. The elements 92 have outwardly directed teeth 93, conveniently of inverted dovetail form, which mesh with corresponding inwardly directed teeth 94 on a fixed plate or stator 95. In this particular embodiment there are twenty elements 92 each with four teeth 93 and there are 81 teeth 93 on the stator. The elements 92, when in mesh with the stator 95, are sufficiently far apart that they can be withdrawn inwardly to a disengaged position. Orbital movement of the elements 93 is effected, by rotation of the eccentric 3 relative to the capturing plate 90, causing the latter to gyrate and so effecting the required orbital movement of the elements 93. The ovoid or circular holes have profiles as previously described to give positive engagement and disengagement in the appropriate parts of the cycle. The arrangement thus constitutes a "one-tooth differential" driving the capturing plate 90 with a speed reduction ratio of 1:80. In FIG. 17, two pins 12 are used for each element 92 to prevent tilting but one pin per element may be used if tilting is prevented by other means.

Figure 18:
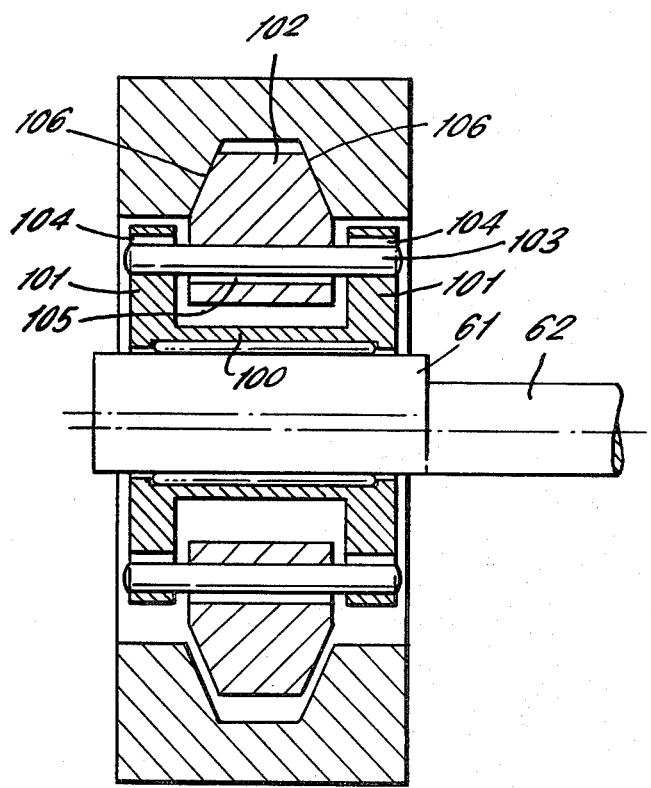
FIG. 18 is a view similar to FIG. 15 but illustrating a modification.

A friction drive arrangement may also be constructed with a female configuration as shown in FIG. 18. This may conveniently be compared with FIG. 15 showing a corresponding male construction. In FIG. 18 an input shaft 62 drives an eccentric 61 on which is rotatably mounted a capturing plate assembly 100 incorporating two parallel plates 101 lying one on each side of the movable elements 102. Pins 103 extend each through an ovoid or circular hole 104 in each of the plates 101 and through an ovoid or circular hole 105 in the elements 102. Conveniently there are two pins per element but it is possible to use only one pin per element if tilting is prevented by other means. The elements 102 have side surfaces shaped to engage conical surfaces 106 in the stator. The elements must, when engaged, be spaced circumferentially to permit of them moving radially inwardly when so guided in their individual orbital paths by the pins 103 and holes 104,105. As in the male frictional drive arrangement, the magnitude of the orbital movement of the elements 102 determines the amount of movement relative to the member (in this case the stator) with which these elements engage. This orbital movement will be small compared with the arcuate spacing of the elements and hence high speed ratios are readily possible.

It is believed unnecessary to describe further the operation of the female configurations; this is generally analogous to the operation of male arrangements previously described. Female constructions may have back-to-centre couplings as in male arrangements.

In all the embodiments thus far described, a "double ovoid" technique (see U.S. Pat. No. 4,194,415 or U.K. No. 1585961) has been employed, that is to say there are ovoid holes in the meshing elements and ovoid holes in the capturing plate, the pins rolling around the peripheries of both holes. Particularly because of the small eccentricity which may be employed in embodiments of the present invention, it may be more convenient in some cases to use a "single ovoid" configuration (see U.S. Pat. No. 4,023,440 or U.K. No. 1519588) in which the pins are journalled in the meshing elements and roll around respective ovoid holes in the capturing plate or are journalled in the capturing plate and roll around ovoid holes in the meshing elements.

Figure 19:
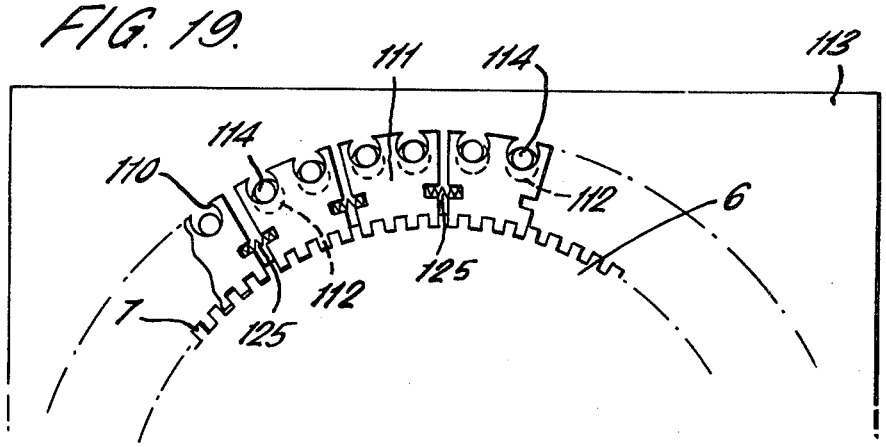
FIGS. 19 and 20 illustrate respectively further modifications of a datum plate and of connector elements.
Figure 20:
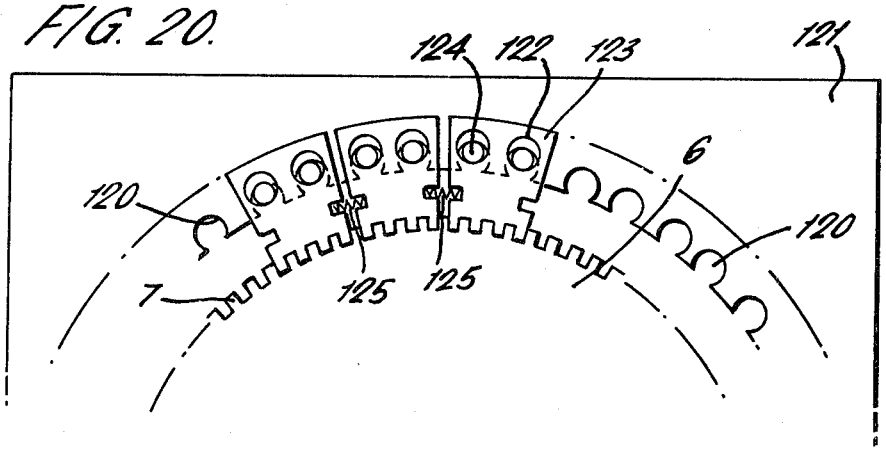

The ovoid holes hold the pins in captive dependency. As has been explained, each hole has a profile with two portions, one portion being shaped for moving the elements into engagement and holding them there and the second portion moving the elements out of engagement and holding them out of engagement, that is to say preventing them from moving into engagement in this part of the cycle. The second portions of the profiles, provided they ensure proper movement out of engagement, are not critical and, as previously explained are conveniently circular arcs. It is possible to use "open-loop" profiles (as distinct from "closed-loop" profiles) so long as alternative disengaging means (such as springs) is provided in place of said second portions which have been removed to form the open loop. To ensure captive dependency, in general the open loops would be only on the capturing plates or only on the meshing elements but in certain circumstances it may be convenient for the profiles to be open on both. As previously explained, with the small eccentricity possible using the present invention, the profiles may be circular arcs. FIG. 19 illustrates an arrangement similar to FIG. 1 but with open-loop profiles 110 on meshing elements 111 but closed-loop profiles 112 on a capturing plate (i.e. datum member) 113. Connector pins 114 engage with and are retained by the profiles 110, 112. FIG. 20 illustrates an arrangement similar to FIG. 1 but with open-loop profiles 120 on a datum plate 121 and closed-loop profiles 122 on meshing elements 123. Connector elements 124 engage with and are retained by the profiles 120, 122. Such open-loop profiles may facilitate manufacture and assembly of the device. The pins and profiles in the constructions of FIGS. 19 and 20 operate, as described with reference to FIG. 1, to control the orbital movement of the connector elements with respect to the wheel 6 and also, since there are two pins for each element, to prevent tilting of the elements. In both these configurations springs 125 provide the disengaging means.

All the arrangements employing teeth which have been described with reference to the drawings are "single-teeth differential" constructions in which the male and female assemblies effectively have n and n+1 teeth respectively, although, as for example in FIG. 7, teeth can be omitted from certain elements. The single-tooth differential gives the largest speed ratio; obviously however if lower speed ratios are required it is possible to have a difference of more than one tooth on the male and female assemblies.

I claim:

1. A motion transmitting device including eccentric means, wheel means, non-linked and non-rotatable independently movable elements adapted to engage said wheel means and movement-limiting means including a datum member with first profiles, second profiles in said independently movable elements and individual connector elements each engaging a first profile and a second profile to be held in captive dependency thereby wherein rotation of the eccentric means causes said movable elements sequentially to become engaged with a portion of the wheel means and subsequently to become disengaged therefrom, said independently movable elements being individually guided by said movement-limiting means within predetermined limits of orbital motion relative to said datum member such that one or more of said independently movable elements is/are in engagement with and stationary relative to a respective portion or portions of the wheel means, said first and second profiles constraining the independently movable elements to move into engagement with the wheel means and to remain in engagement therewith over an arc of less than a semicircle and disengaging means constraining the independently movable elements to disengage from and to remain disengaged from the wheel means over the remaining arc.

2. A motion transmitting device as claimed in claim 1 wherein said wheel means is a male wheel and wherein said independently movable elements are arranged around the wheel means and are moved inwardly to engage the wheel means.

3. A motion transmitting device as claimed in claim 2 wherein said independently movable elements, when they are drivingly engaged with the wheel means, each abuts against its neighbours on flanking surfaces to form a rigid structure.

4. A motion transmitting device as claimed in claim 3 wherein said flanking surfaces of said independently movable elements are such that the elements are wedge-shaped forming a circular arch when in engagement with the wheel means.

5. A motion transmitting device as claimed in claim 1 wherein said wheel means is a female wheel and wherein said independently movable elements are arranged inside the wheel means and are moved outwardly into engagement with the wheel means.

6. A motion transmitting device as claimed in claim 1 wherein said independently movable elements are spaced apart from one another when in driving engagement with the wheel means.

7. A motion transmitting device as claimed in claim 2 wherein said disengaging means comprise springs between adjacent ones of said independently movable elements urging said elements apart.

8. A motion transmitting device as claimed in claim 1 wherein disengaging means are constituted by said connector elements and portions of said first and second profiles.

9. A motion transmitting device as claimed in claim 5 wherein the radially outward portions of said first profiles and the radially inward portions of said second profiles are so shaped as positively to hold the independently movable elements out of engagement with the wheel means over an arc of more than a semicircle.

10. A motion transmitting device as claimed in claim 2 wherein the radially inward portions of said first profiles and the radially outward portions of said second profiles are so shaped as positively to hold the independently movable elements out of engagement with the wheel means over an arc exceeding a semicircle.

11. A motion transmitting device as claimed in claim 1 wherein the independently movable elements are meshing elements each having a tooth or teeth adapted to mesh with a tooth or teeth on said wheel means.

12. A motion transmitting device as claimed in claim 11 wherein the wheel means is a toothed wheel with evenly spaced teeth.

13. A motion transmitting device as claimed in claim 12 wherein each meshing element, when in engagement with the toothed wheel, extends around an arcuate portion of the wheel embracing a plurality of teeth on the wheel.

14. A motion transmitting device as claimed in claim 12 wherein each meshing element, when in engagement with the toothed wheel, extends around an arcuate portion of wheel embracing at least four teeth on the wheel.

15. A motion transmitting device as claimed in claim 12 wherein said first and second profiles are so shaped that each cycle of orbital movement of the meshing element changes the position of that meshing element with respect to the wheel by one tooth pitch on the wheel.

16. A motion transmitting device as claimed in claim 12 wherein each independently movable element is shaped so as to engage with all the teeth in the arc over which the element extends.

17. A motion transmitting device as claimed in claim 4 wherein the independently movable elements and wheel means have complementary mating surfaces to give rigid contact when in engagement.

18. A motion transmitting device as claimed in claim 12 wherein the wheel means comprises a toothed wheel with evenly spaced teeth and with the gaps between the teeth of inverted dovetail shape and wherein the independently movable elements have teeth complementary to said recesses.

19. A motion transmitting device as claimed in claim 12 wherein said movable meshing elements each have a plurality of teeth, said teeth in said meshing elements being in the form of inverted dovetails which mate with complementary inverted dovetail shaped teeth in the wheel means.

20. A motion transmitting device as claimed in claim 1 wherein the independently movable elements and wheel means are adapted for frictional engagement when the elements are in contact with the wheel means.

21. A motion transmitting device as claimed in claim 1 wherein the wheel means is a V-pulley and wherein the independently movable elements are shaped for frictional engagement with said pulley.

22. A motion transmitting device as claimed in claim 21 wherein said independently movable elements have concave faces engaging conical flange surfaces of the pulley to be in area contact therewith.

23. A motion transmitting device as claimed in claim 5 wherein the wheel means has an inwardly directed V-groove into which said independently movable elements are moved to engage the wheel means.

24. A motion transmitting device as claimed in claim 1 wherein said first and second profiles are so shaped that each cycle of orbital movement of one of said independently movable elements changes the position of that element with respect to the wheel means by an angular arc around the wheel less than the arc engaged by each element.

25. A motion transmitting device as claimed in claim 1 wherein each connector element is shaped to roll along its associated first profile and its associated second profile.

26. A motion transmitting device as claimed in claim 25 wherein each connector element is a cylindrical element of uniform diameter.

27. A motion transmitting device as claimed in claim 1 wherein each of said first profiles has a design centre and all such design centres lie on the circumference of a circle.

28. A motion transmitting device as claimed in claim 1 wherein each of the first and second profiles are circular.

29. A motion transmitting device as claimed in claim 1 wherein each of said first profiles is of ovoid form.

30. A motion transmitting device as claimed in claim 1 wherein each of said first profiles is of circular form and wherein said connecting elements are cylindrical pins of smaller diameter than said first profiles.

31. A motion transmitting device as claimed in claim 1 wherein each of said second profiles is of ovoid form.

32. A motion transmitting device as claimed in claim 1 wherein each of said second profiles is of circular form and wherein said connecting elements are cylindrical pins of smaller diameter than said second profiles.

33. A motion transmitting device as claimed in claim 1 wherein the connector elements are guided by said first profiles and are journalled by said second profiles for rotational movement in said independently movable elements.

34. A motion transmitting device as claimed in claim 1 wherein the connector elements are guided by said second profiles and are journalled by said first profiles for rotational movement in said datum member.

35. A motion transmitting device including eccentric means, meshing means in the form of a series of non-linked and non-rotatable wedge-shaped elements each formed with a plurality of first teeth at the narrower end of said wedge-shaped elements, gear means formed with second teeth complementary to said first teeth, a datum member formed with first profiles of predetermined shape, said wedge-shaped elements being formed with second profiles of predetermined shape, individual connector elements separate from one another, each engaged in loose captive dependency within said first and said second profiles, and wherein said eccentric means is disposed to cause said wedge-shaped elements to sequentially perform a wobbling motion in and out of meshing engagement with successive said teeth of said gear means while each said wedge-shaped element is guided within specific limits of said wobbling motion by said connector elements engaging within said first and second profiles, said meshing elements when drivingly engaged in the radially implosive portion of the driving and reverse driving cycle being so formed on their radial flanks to abut each against its neighbors to form a rigid circular arch and thereby to form a rigid structure with said wheel means and said meshing elements are drivingly engaged by the connector elements to remain out of engagement during the disengaged portion of the cycle.

36. A motion transmitting device including eccentric means, meshing means in the form of a series of non-linked and non-rotatable wedge-shaped elements with at least one tooth at the narrower end of each element, a datum member formed with first profiles of predetermined shape, each of said first profiles having a first design centre with all said first design centres disposed on a first circle about a first axis, gear means formed with second teeth complementary to said at least one tooth, said second teeth defining a second pitch circle about a second axis, said wedge-shaped elements being formed with second profiles of predetermined shape, each of said second profiles having a second design centre, individual connector elements, totally separate from one another, each engaged in loose captive dependency within said first and second profiles, each of said connector elements having a longitudinal axis, wherein said eccentric means is disposed to cause each of said wedge-shaped elements, at its toothed end, to become engaged with, and subsequently to become dissociated from, said teeth, whilst said wedge-shaped elements are individually guided by said connector elements engaging said first and second profiles within specific limits of movement relative to said datum member, such that always one or more of said wedge-shaped elements are in engagement with, and stationary relative to a tooth or teeth on said gear means, and such that the total movement relative to said datum member of each of said wedge-shaped elements, whilst it is drivingly engaged with one of said second teeth, follows an orbital locus which is the same as that of said gear means, said second design centres on those wedge-shaped elements which are stationary relative to the gear means all lying on the arc of a third circle which is concentric with said second pitch circle, said first and third circles intersecting one another said longitudinal axes of said connector elements which are engaging wedge-shaped elements stationary relative to the gear means all lying on the arc of a fourth circle, having a third axis, any two of said first, third and fourth circles intersecting one another.

37. A motion transmitting device as claimed in claim 36 wherein all three said first, third and fourth circles intersect one another at the same two points.

38. A motion transmitting device as claimed in claim 36 wherein said wedge-shaped elements are formed so that those elements, when in engagement with the gear means, abut one another to for a rigid structure.

39. A motion transmitting device including eccentric means, meshing means in the form of a series of wedge-shaped elements with first inverted dovetail-like teeth at the narrower end of each element, gear means formed with second teeth complementary to said first teeth, individual tilt-limiting means on said wedge-shaped elements arranged to prevent relative tilting of the elements, a datum member, a series of individual movement-limiting means comprising first profiles on said datum member and second profiles on said wedge-shaped elements with individual connector elements each engaging a first profile and a second profile to be held in captive dependency thereby, said further movement-limiting means being separate from said teeth, said eccentric means being disposed to cause each of said wedge-shaped elements to become engaged with and subsequently to become dissociated from said gear means whilst said wedge-shaped elements are individually guided by said movement-limiting means within specific limits of movement relative to said datum member, such that always first teeth of a plurality of adjacent ones of said wedge-shaped elements are simultaneously engaged with, and stationary relative to, a corresponding number of said second teeth on said gear means, and so that the total movement relative to said datum member of each of said first teeth, whilst it is drivingly engaged with said second teeth, follows an orbital locus, said wedge-shaped elements being formed to abut against adjacent elements when in engagement with the gear means to form a rigid structure.

40. A motion transmitting device as claimed in claim 36 wherein said orbital locus is circular.

41. A motion transmitting device as claimed in claim 35 wherein said first profiles have radially inward portions and wherein said second profiles have radially outward portions which are designed to provide positive disengagement of said wedge-shaped meshing elements.

42. A motion transmitting device as claimed in claim 2 wherein springs are provided between the independently movable or wedge-shaped elements for disengaging those elements from said wheel or gear means.

43. A motion transmitting device as claimed in claim 42 wherein said springs are arranged to prevent said elements from tilting relative to one another when disengaged from the wheel means.

44. A quadrant drive motion transmitting device having eccentric means, wheel means with portions shaped to engage with independently movable meshing elements and movement-limiting means including a datum member, the eccentric means being arranged to cause the meshing elements sequentially to enter into and subsequently move out of engagement with portions of said wheel means, said meshing elements being individually guided by said movement-limiting means and wherein of the three integers comprising the eccentric means, the wheel means, the datum member, one is connected to a rotational input, another is connected to a rotational output and a third is fixed, characterised in that the wheel means comprises a wheel with $(m\ n-1)$ evenly spaced stations for engaging meshing elements and in that there are $m$ meshing elements, each having an inwardly facing portion adapted to engage with the wheel over an arcuate extent of $n$ stations on the wheel, where $m$ is an integer equal to or greater than 8, $n$ is an integer equal to or greater than 2 and furthermore characterised in that the meshing elements have side flanks shaped such that these elements, when in engagement with the wheel, form a rigid arch.

45. A motion transmitting device as claimed in claim 44 where m is an integer equal to or greater than 16.

46. A motion transmitting device as claimed in claim 44 where n is an integer equal to or greater than 4.

47. A motion transmitting device as claimed in claim 44 wherein the movement-limiting means include, for each meshing element, a connector pin adapted to roll around a closed profile on the datum member and a closed profile on the meshing element.

48. A motion transmitting device as claimed in claim 47 wherein each connector pin is cylindrical and wherein each closed profile is a circular hole of larger diameter than the connector pin.

49. A motion transmitting device as claimed in claim 44 wherein said stations are formed by evenly spaced outwardly directed teeth on the wheel.

50. A motion transmitting device as claimed in claim 49 wherein each meshing element has n teeth or is shaped to engage with n teeth on the wheel.

51. A motion transmitting device as claimed in claim 44 wherein the movement-limiting means are shaped so that each meshing element is held radially outwardly from the wheel to be out of engagement from the wheel over an arc greater than 180°.

52. A motion transmitting device as claimed in claim 49 wherein the meshing elements and wheel have teeth profiles of inverted dovetail form.

53. A motion transmitting device as claimed in claim 44 wherein the meshing elements are wedge-shaped with the flanking surfaces straight and, when the elements engage the wheel, radial with respect to the centre of the wheel.

54. A motion transmitting device as claimed in claim 44 and having compression springs between the meshing elements arranged to hold the elements apart in the circimferential direction when they are displaced radially outwardly from engagement with the wheel.

55. A motion transmitting device as claimed in claim 1 wherein said second profiles on the independently movable or meshing elements are of open loop form and wherein disengaging means are provided in addition to the movement-limiting means comprising the first and second profiles and connector elements.

56. A motion transmitting device as claimed in claim 1 wherein said first profiles on the datum member are of open loop form and wherein disengaging means are provided in addition to the movement-limiting means comprising the first and second profiles and connector elements.

57. A motion transmitting device as claimed in claim 1 wherein said first profiles and said second profiles are of open loop form and wherein disengaging means are provided in addition to the movement limiting means comprising the first and second profiles and connector elements.

58. A motion transmitting device as claimed in claim 1 wherein each independently movable element or meshing element has a tongue extending into a groove in an adjacent element to prevent relative tilting of the elements when they move apart.

59. A motion transmitting device as claimed in claim 1 wherein each of said meshing or independently movable elements has two or more spaced second profiles engaged by separate connecting elements engaging separate first profiles in the datum member to prevent any substantial angular rotation of the said meshing or independently movable elements.

60. A motion transmitting device as claimed in claim 1 wherein either said first profiles are bearings permitting rotation of the connector elements in the datum member and said second profiles define the limits of orbital motion of the independently movable or meshing elements with respect to the datum member or said second profiles are bearings permitting rotation of the connector elements in the independently movable or meshing elements and said first profiles define the limits of orbital motion of the independently movable or meshing elements with respect to the datum member.

61. A motion transmitting device as claimed in claim 12 wherein the pitch circle of the teeth on said wheel has the same radius as the pitch circle of the teeth on said meshing elements in engagement with the wheel.

62. A motion transmitting device as claimed in claim 1 wherein each of said second profiles has a design centre and wherein the design centres of the second profiles of all elements in engagement with the wheel means lie on a circle or circles having a common centre.

63. A motion transmitting device as claimed in claim 1 and having female gear means wherein said second profiles have radially inward portions and said first profiles having radially outward portions providing positive disengagement of said elements.

* * * * *